United States Patent Office 3,110,700
Patented Nov. 12, 1963

3,110,700
PROCESS FOR THE PRODUCTION OF EUPOLY-OXYMETHYLENES
Heinrich Hopff, Zurich, Switzerland, Ulrich Hoffmann, Bad Homburg vor der Höhe, Germany, and Hermann Metzler, Zurich, Switzerland, assignors to Deutsche Gold- und Silber-Scheideanstalt vormals Roessler, Frankfurt am Main, Germany
No Drawing. Filed Apr. 14, 1960, Ser. No. 22,088
Claims priority, application Germany Apr. 18, 1959
12 Claims. (Cl. 260—67)

The present invention relates to the production of eupolyoxymethylenes.

The object of the present invention is to provide novel polymerization catalysts for the polymerization of eupolyoxymethylenes. The utilization of these catalysts, furthermore, results in the production of polyoxymethylenes which have high molecular weights and which exhibit good thermoplastic characteristics.

Eupolyoxymethylenes can be produced by several different processes. Among these processes, for example, there is the technique of polymerizing monomeric formaldehyde in an inert liquid medium in the absence of water and in the presence of dispersing agents and polymerization catalysts, such as, aliphatic or aromatic amines. Such processes are disclosed in U.S. 2,768,994 and "High Molecular Organic Compounds" (Die hochmolecularen organischen Verbindungen), H. Staudinger and W. Kern, 1932, pages 280–287. Trialkylarsines, trialkylstibines and trialkylphosphines have also been used as catalysts in these polymerization techniques. Furthermore it is also known to the art that formaldehydes can be polymerized at lower temperatures in solvents in the presence of sulfuric acid or boron trichloride. The polymerization can also be conducted so that a small portion of the total quantity of formaldehyde to be polymerized is first polymerized before the remaining major portion is polymerized and this smaller quantity of polymer is then separated from the as yet unpolymerized major portion of the monomer together with any impurities that may be present.

It has also been proposed, in order to obtain eupolyoxymethylenes with improved resistance to heat, to polymerize the monomeric formaldehyde in the presence of a sulfur compound which contains the structural element

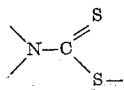

Sulfur compounds of this type include, for example, thiouram disulfide, tetramethyl thiouram disulfide, 2-mercaptobenzothiazole and the like. This disclosure is made in U.S. application S.N. 815,280, filed May 25, 1959.

It is also known that eupolyoxymethylenes can be produced from formaldehyde in the presence of compounds having the general formula RnM, in which M is a metal such as copper or aluminum and R is a thiohydrocarbon radical.

It has also been proposed, as disclosed in U.S. application S.N. 690, filed January 6, 1960 now Patent Number 3,020,264, to produce eupolyoxymethylenes from monomeric formaldehyde by conducting the polymerization in the presence of sulfur suspended or dissolved in dry benzine and/or decalin and by using monomeric formaldehyde that has freed of moisture as much as possible. In this procedure the cross-sectional particle size of the suspended sulfur is preferably smaller than 200μ. According to this proposed process the sulfur to be used can be ventilated pure sulfur or fine particled plastic sulfur or a monoclinic or a macromolecular sulfur which is insoluble in rubber.

It has now been found, according to the present invention, that eupolyoxymethylenes can also be produced easily and in good yields by the polymerization of water free formaldehyde or lower molecular weight polymers of formaldehyde in the presence of an inert organic diluent, if desired, and a catalyst, if at least one halogenated methane is used as the catalyst. Such halogenated methanes, for example, are carbon tetrachloride, chloroform, methylene chloride, bromoform and the like. Carbon tetrachloride is preferred. By lower molecular weight polymers of formaldehyde, it is meant within the scope of this invention, materials such as trioxane and the like.

These halogenated methanes are preferably used in amounts of 0.01 to 10% by weight, with respect to the amount of starting formaldehyde compound used.

Often, it is also advantageous to use other catalysts, known to the art, in combination with the novel catalysts of this invention in carrying out the polymerization of the formaldehyde. Such other catalysts, which may be used with the halogenated methanes of the present invention, include, for example, amines, preferably tertiary amines such as triethylamine, tributylamine, and so forth; and metal carbonyls, such as iron pentacarbonyl, cobalt carbonyl, molybdenum carbonyl and the like.

The polymerization process of this invention can be so conducted that the starting material, for example, the water free formaldehyde or the trioxane, is mixed with small amounts of the halogenated methane alone or in combination with the other known catalysts and is then allowed to stand at room or slightly higher temperatures until the termination of the polymerization reaction. In case water free formaldehyde is being used, it is also advantageous to so proceed that the catalyst is first dissolved in an inert solvent, such as petroleum ether or a higher boiling hydrocarbon fraction, and then the water free formaldehyde is introduced into the catalyst solution with stirring. It is also advantageous, however, to conduct the polymerization, using in this case lower molecular weight polyoxymethylenes such as trioxane, by heating the starting material with the catalyst in a closed vessel at a moderate temperature, for example, between 50 and 90° C. It is advantageous in this latter procedure to effect a good intermixing of the reactants by stirring them or agitating the vessel. As the polymerization proceeds, either at room temperature or at moderate temperatures, the initially clear solution of reactants becomes turbid as the polymers produced separate out and the system is gradually transformed into a solid end product. At the termination of the reaction the lower molecular weight portions of the system can be removed by washing the finished product with methanol and extracting the lower molecular weight polymers with a dilute solution of sodium hydroxide. The yield fluctuates between 50 and 90% depending on the particular catalyst or combination of catalysts used. The molecular weight of the eupolyoxymethylenes produced varies between 20,000 and several hundred thousand depending on the reaction conditions. These eupolyoxymethylenes have a softening point of approximately 185° C.

The eupolyoxymethylenes produced according to this invention can be readily worked up into formed bodies in the customary thermoplastic processes, such as, for example, extrusion molding, pressing, and the like, or they can be used to coat objects. When desirable, it is also possible to conduct the process of this invention in the presence of other known materials for improving the workability of the eupolyoxymethylenes and/or their stability and/or mechanical properties of the shaped bodies produced therefrom. Among such materials are plasticizers, such as the glycols, particularly propylene glycol and stabilizers, that is, compounds which react with hydroxyl groups, such as carboxylic acid anhydrides, for example, acetic acid anhydride, propionic acid anhydride and the like, and ketenes. In addition urea, hydrazine and the like can also be used as stabilizers.

It is possible to obtain formed bodies which are ductile and elastic from the novel eupolyoxymethylenes produced by this invention. Furthermore when these formed bodies are heated to 180° C. for an hour only a trivial amount of depolymerization takes place.

Fillers and coloring agents can also be used in admixture with these novel eupolyoxymethylenes. This particularly includes such materials as glass fibers and mineral wool.

It is also advantageous in this regard to use highly dispersed, particularly active filling materials, for example, carbon black and preferably alkaline carbon black or oxides of metals or metalloids such as aluminum oxide, titanium oxide, zirconium oxide or silicon dioxide which were obtained by decomposing volatilized compounds of these materials at high temperature in an oxidizing or hydrolyzing medium.

*Example 1*

40 parts of trioxane were melted with 0.4 part of chloroform in an enamel vessel and heated for 24 hours at 70° C. After this time the total reaction mixture had become a solid, white mass, which was thereafter comminuted and the small pieces were first washed with methanol to remove the unreacted trioxanes and then treated with a dilute solution of sodium hydroxide to separate the lower molecular weight polyoxymethylenes. Residual quantities of sodium hydroxide were washed out and the product was dried. 23 parts of eupolyoxymethylenes having a molecular weight of approximately 32,000 and a softening point of 185° C. were thereby produced.

*Example 2*

10 parts of trioxane were heated with 0.5 part of carbon tetrachloride for 72 hours at 70° C. as in Example 1. The reaction vessel was kept at a relatively slow rate of rotation. Following the recovery procedure used in Example 1, 8 parts of eupolyoxymethylenes having a molecular weight of 35,000 and a softening point of about 185–190° were thereby produced.

A comparative reaction was also conducted using the procedure and reaction conditions of Example 2 above with the exception that the carbon tetrachloride was not added. The yield of eupolyoxymethylenes was only 0.1–1%, which could be raised to 10–15% by agitating the reaction vessel.

*Example 3*

One part of carbon tetrachloride was dissolved in 100 parts of petroleum ether (B.P. 50–80° C.) and gaseous water free formaldehyde was then introduced into this solution at 60–70° C. After a short time the clear solution became turbid as the solid eupolyoxymethylenes separated out. These polymers were filtered off and removed as a white powder. The end groups were then acetylated at room temperature by treating the polymers with acetic acid anhydride. This final product thus produced had a softening point of about 185° C.

The reaction can also be conducted continuously using a countercurrent flow reaction tower. The gaseous formaldehyde, in this technique, is introduced near the bottom of a tower and caused to pass, countercurrently, through the petroleum ether solution of carbon tetrachloride. The resulting polymeric dispersion is then continuously drawn off at the base of the tower.

We claim:
1. In a process for the production of eupolyoxymethylenes, the step which comprises polymerizing a formaldehyde compound selected from the group consisting of monomeric formaldehyde and trioxane in the presence of 0.01–10% by weight relative to the amount of said formaldehyde compound of a halogenated methane selected from the group consisting of carbon tetrachloride, chloroform, methylene chloride and bromoform at a temperature between room temperature and 90° C.

2. A process as in claim 1 in which said halogenated methane is chloroform.

3. A process as in claim 1 in which said halogenated methane is carbon tetrachloride.

4. A process as in claim 1 in which said formaldehyde compound is monomeric formaldehyde in substantially water free form.

5. A process as in claim 4 in which said halogenated methane is dissolved in an inert organic solvent and said monomeric formaldehyde is introduced into and polymerized in said solution.

6. A process as in claim 5 in which said solvent is petroleum ether.

7. A process as in claim 1 in which said temperature is between 50–90° C.

8. A process as in claim 1 in which said formaldehyde compound is trioxane.

9. A process as in claim 8 in which said polymerization is conducted at a temperature between 50 and 90° C. with the agitation of the polymerization system in a closed vessel.

10. A process as in claim 1 further comprising conducting said polymerization in the presence of at least a second catalyst selected from the group consisting of amines and metal carbonyls.

11. A process as in claim 10 in which said second catalyst is a tertiary amine.

12. A process for the production of eupolyoxymethylenes which comprises heating a mixture essentially consisting of trioxane and 0.01–10% by weight of a halogenated methane selected from the group consisting of carbon tetrachloride, chloroform, methylene chloride and bromoform based on said trioxane to a temperature between 50 and 90° C. in a closed vessel until a eupolyoxymethylene is formed.

References Cited in the file of this patent

UNITED STATES PATENTS

| 2,768,994 | MacDonald | Oct. 30, 1956 |
| 3,017,389 | Langsdorf et al. | Jan. 16, 1962 |

FOREIGN PATENTS

| 560,984 | Canada | July 29, 1958 |

OTHER REFERENCES

Walker: "Formaldehyde," Reinhold Publishing Corp., New York, 1953 (chapter 7 relied on).